(12) United States Patent
Dorai et al.

(10) Patent No.: US 11,361,338 B1
(45) Date of Patent: Jun. 14, 2022

(54) SYSTEM AND METHOD FOR GENERATING A NOTIFICATION TO OFFSET A PURCHASE PRICE

(71) Applicant: The Toronto-Dominion Bank, Toronto (CA)

(72) Inventors: Sahana Dorai, Hamilton (CA); Nolan Glynn-Udrow, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/220,015

(22) Filed: Apr. 1, 2021

(51) Int. Cl.
*G06Q 30/02* (2012.01)
*G06Q 20/38* (2012.01)
*G06Q 20/12* (2012.01)

(52) U.S. Cl.
CPC ......... *G06Q 30/0233* (2013.01); *G06Q 20/12* (2013.01); *G06Q 20/387* (2013.01)

(58) Field of Classification Search
CPC ... G06Q 30/0233; G06Q 20/387; G06Q 20/12
See application file for complete search history.

(56) References Cited

U.S. PATENT DOCUMENTS

| | | |
|---|---|---|
| 7,742,943 B2 | 6/2010 | Postrel |
| 8,666,805 B2 | 3/2014 | Chase |
| 9,251,528 B1 | 2/2016 | Mcghie et al. |
| 9,704,174 B1 | 7/2017 | Mcghie et al. |
| 9,747,614 B2 | 8/2017 | Antonucci |
| 10,339,555 B2 | 7/2019 | Kumar Goel |
| 10,872,349 B1 | 12/2020 | Hijirida et al. |
| 2002/0116266 A1* | 8/2002 | Marshall ................ G06Q 10/10 705/14.14 |

(Continued)

FOREIGN PATENT DOCUMENTS

EP 3414713 8/2017

OTHER PUBLICATIONS

"Automated push Notifications for Loyalty Rewards—LoyaltyLion Integration" (Kumar, Shaskank, published on Oct. 22, 2020 (as captured by internet Wayback Machine) at https://docs.pushowl.com/en/articles/3529416-automated-push-notification-for-loyalty-rewards-loyaltylion-integration) (Year: 2020).*

(Continued)

*Primary Examiner* — James M Detweiler
(74) *Attorney, Agent, or Firm* — Rowand LLP

(57) ABSTRACT

A computer-implemented method comprises determining an amount of loyalty points stored in a loyalty points account; receiving, from a computing device, a signal indicating selection of one or more items to be monitored; monitoring a purchase price of the one or more selected items and the amount of loyalty points stored in the loyalty points account; determining that a difference between the purchase price of the one or more selected items and the amount of loyalty points drops below a threshold; and responsive to determining that the difference between the purchase price of the one or more selected items and the amount of loyalty points drops below the threshold, sending, to the computing device, a signal causing the computing device to display a notification that includes a selectable option to apply the loyalty points to offset the purchase price.

18 Claims, 14 Drawing Sheets

(56) References Cited

U.S. PATENT DOCUMENTS

| | | | |
|---|---|---|---|
| 2005/0240472 A1* | 10/2005 | Postrel | G06Q 30/0623 |
| | | | 705/14.27 |
| 2005/0251446 A1* | 11/2005 | Jiang | G06Q 20/40 |
| | | | 235/380 |
| 2009/0125386 A1 | 5/2009 | Willison et al. | |
| 2010/0082480 A1* | 4/2010 | Korosec | G06Q 20/381 |
| | | | 705/40 |
| 2011/0295675 A1* | 12/2011 | Reodica | G06Q 30/0234 |
| | | | 705/14.34 |
| 2013/0159087 A1 | 6/2013 | Boyd et al. | |
| 2013/0226687 A1* | 8/2013 | Perry | G06Q 20/384 |
| | | | 705/14.33 |
| 2013/0262574 A1* | 10/2013 | Cohen | H04L 51/18 |
| | | | 709/204 |
| 2014/0195324 A1* | 7/2014 | Hage | G06Q 30/0228 |
| | | | 705/14.29 |
| 2014/0200983 A1 | 7/2014 | Bacastow et al. | |
| 2014/0279231 A1* | 9/2014 | Pinski | G06Q 20/12 |
| | | | 705/26.41 |
| 2017/0161770 A1 | 6/2017 | Toumayan et al. | |
| 2018/0108054 A1* | 4/2018 | Doubinski | G06Q 30/0601 |
| 2018/0114287 A1* | 4/2018 | Hoffman | G06Q 50/20 |
| 2019/0108543 A1 | 4/2019 | Chan et al. | |
| 2020/0126107 A9 | 4/2020 | Shah et al. | |
| 2021/0105233 A1* | 4/2021 | Tran | H04L 51/066 |
| 2021/0295368 A1* | 9/2021 | Taffer | G06Q 30/0635 |

OTHER PUBLICATIONS

"Important Update for Loyalty: Add multiple rewards, customize your Loyalty terminology and more" (posted on Jul. 9, 2018 by dmaniar on the square seller community online at https://www.sellercommunity.com/t5/Product-Updates/Important-Update-for-Loyalty-Add-multiple-rewards-customize-your/ba-p/86680) (Year: 2018).*

"How do I know if Honey is Working?" (published on Feb. 18, 2021 as captured by internet Wayback Machine at https://help.joinhoney.com/article/54-how-do-i-know-if-honey-is-working#:~:text=To%20make%20sure%20Honey%20is,will%20be%20illuminated%20in%20green.) (Year: 2021).*

Erik Paquet; Get Alerts When Your Points Post with AwardWallet Balance Watch; Published in AwardWallet.com; https://awardwallet.com/blog/balance-watch/; Published Mar. 12, 2019.

* cited by examiner

US 11,361,338 B1

SYSTEM AND METHOD FOR GENERATING A NOTIFICATION TO OFFSET A PURCHASE PRICE

TECHNICAL FIELD

The present application relates to systems and methods for generating a notification to offset a purchase price.

BACKGROUND

During an online shopping experience, a user may wish to apply loyalty points to reduce or offset the cost of one or more items.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
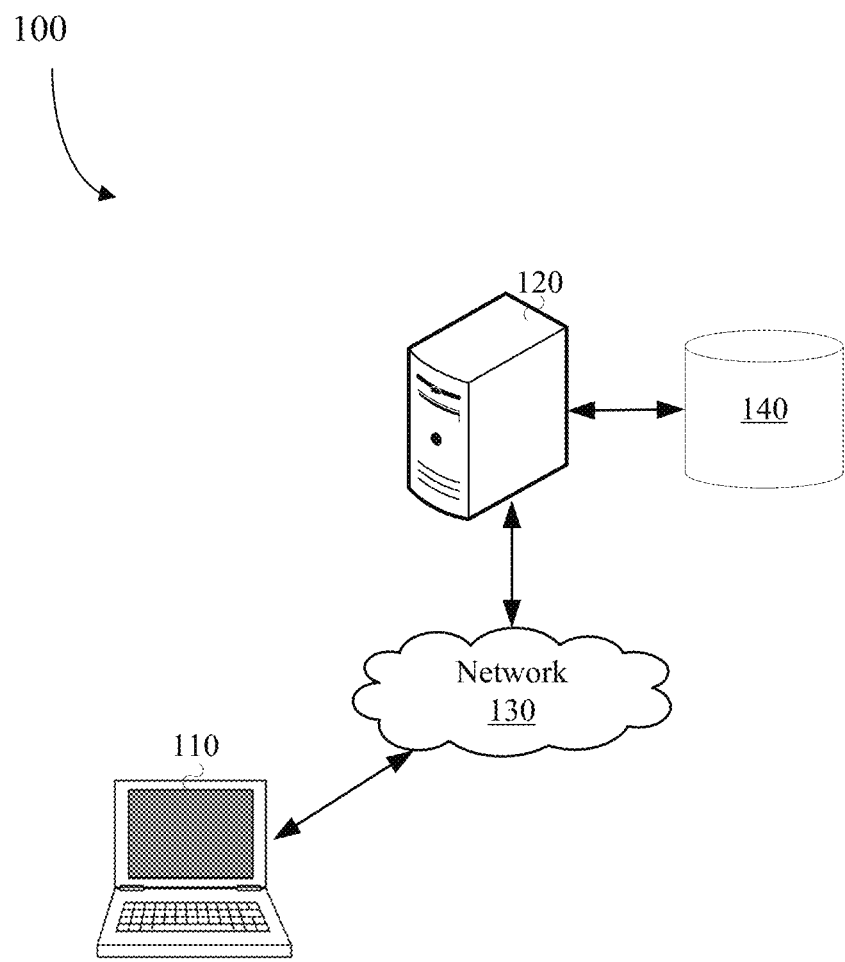
FIG. 1 is a schematic operation diagram illustrating an operating environment of an example embodiment.

In an aspect there is provided a server computer system comprising a communications module; a processor coupled with the communications module; and a memory coupled to the processor and storing processor-executable instructions which, when executed by the processor, configure the processor to determine an amount of loyalty points stored in a loyalty points account; receive, via the communications module and from a computing device, a signal indicating selection of one or more items to be monitored; monitor a purchase price of the one or more selected items and the amount of loyalty points stored in the loyalty points account; determine that a difference between the purchase price of the one or more selected items and the amount of loyalty points drops below a threshold; and responsive to determining that the difference between the purchase price of the one or more selected items and the amount of loyalty points drops below the threshold, send, via the communications module and to the computing device, a signal causing the computing device to display a notification that includes a selectable option to apply the loyalty points to offset the purchase price.

In one or more embodiments, the processor-executable instructions, when executed by the processor, further configure the processor to send, via the communications module and to the computing device, a signal causing one or more selectable options to be displayed on a web page active within a web browser executing on the computing device, each selectable option associated with a particular item to be monitored.

In one or more embodiments, the processor-executable instructions, when executed by the processor, further configure the processor to determine that the computing device has an active web session within a web browser executing on the computing device; and responsive to determining that the computing device has the active web session within the web browser executing on the computing device, send the signal causing the computing device to display the notification within the web browser.

In one or more embodiments, the processor-executable instructions, when executed by the processor, further configure the processor to determine that the computing device does not have an active web session within a web browser executing on the computing device; and responsive to determining that the computing device does not have the active web session, send the signal causing the computing device to display the notification as one of an email message or a text message.

In one or more embodiments, the processor-executable instructions, when executed by the processor, further configure the processor to receive, via the communications module and from the computing device, a signal indicating selection of the selectable option to apply loyalty points to offset the purchase price; and responsive to receiving the signal indicating selection of the selectable option to apply loyalty points to offset the purchase price, complete a purchase of the one or more selected items using the loyalty points.

In one or more embodiments, the processor-executable instructions, when executed by the processor, further configure the processor to send, via the communications module and to the computing device, a signal causing the computing device to display a selectable indicator within a web browser executing on the computing device.

In one or more embodiments, the processor-executable instructions, when executed by the processor, further configure the processor to receive, via the communications module and from the computing device, a signal indicating selection of the selectable indicator; and responsive to receiving the signal indicating selection of the selectable indicator, send, via the communications module and to the computing device, a signal causing the computing device to display, within the web browser, the amount of loyalty points stored in the loyalty points account.

In one or more embodiments, the amount of loyalty points stored in the loyalty points account is displayed as a dollar amount based on a conversion rate associated with a web page active within the web browser.

In one or more embodiments, the signal causing the computing device to display the amount of loyalty points stored in the loyalty points account further causes the computing device to display the one or more selected items.

In one or more embodiments, the processor-executable instructions, when executed by the processor, further configure the processor to monitor a conversion rate of loyalty points to dollars; determine a change in the conversion rate of loyalty points to dollars; and responsive to determining the change in the conversion rate of loyalty points to dollars, determine that the difference between the purchase price of the one or more selected items and the amount of loyalty points drops below the threshold.

In another aspect there is provided a computer-implemented method comprising determining an amount of loyalty points stored in a loyalty points account; receiving, via a communications module and from a computing device, a signal indicating selection of one or more items to be monitored; monitoring a purchase price of the one or more selected items and the amount of loyalty points stored in the loyalty points account; determining that a difference between the purchase price of the one or more selected items and the amount of loyalty points drops below a threshold; and responsive to determining that the difference between the purchase price of the one or more selected items and the amount of loyalty points drops below the threshold, sending, via the communications module and to the computing device, a signal causing the computing device to display a notification that includes a selectable option to apply the loyalty points to offset the purchase price.

In one or more embodiments, the method further comprises sending, via the communications module and to the computing device, a signal causing one or more selectable options to be displayed on a web page active within a web browser executing on the computing device, each selectable option associated with a particular item to be monitored.

In one or more embodiments, the method further comprises determining that the computing device has an active web session within a web browser executing on the computing device; and responsive to determining that the computing device has the active web session within the web browser executing on the computing device, sending the signal causing the computing device to display the notification within the web browser.

In one or more embodiments, the method further comprises determining that the computing device does not have an active web session within a web browser executing on the computing device; and responsive to determining that the computing device does not have the active web session, sending the signal causing the computing device to display the notification as one of an email message or a text message.

In one or more embodiments, the method further comprises receiving, via the communications module and from the computing device, a signal indicating selection of the selectable option to apply loyalty points to offset the purchase price; and responsive to receiving the signal indicating selection of the selectable option to apply loyalty points to offset the purchase price, completing a purchase of the one or more selected items using the loyalty points.

In one or more embodiments, the method further comprises sending, via the communications module and to the computing device, a signal causing the computing device to display a selectable indicator within a web browser executing on the computing device.

In one or more embodiments, the method further comprises receiving, via the communications module and from the computing device, a signal indicating selection of the selectable indicator; and responsive to receiving the signal indicating selection of the selectable indicator, sending, via the communications module and to the computing device, a signal causing the computing device to display, within the web browser, the amount of loyalty points stored in the loyalty points account.

In one or more embodiments, the signal causing the computing device to display the amount of loyalty points stored in the loyalty points account further causes the computing device to display the one or more selected items.

In one or more embodiments, the method further comprises monitoring a conversion rate of loyalty points to dollars; determining a change in the conversion rate of loyalty points to dollars; and responsive to determining the change in the conversion rate of loyalty points to dollars, determining that the difference between the purchase price of the one or more selected items and the amount of loyalty points drops below the threshold.

In another aspect there is provided a non-transitory computer readable storage medium comprising computer-executable instructions which, when executed, configure a processor to determine an amount of loyalty points stored in a loyalty points account; receive, via a communications module and from a computing device, a signal indicating selection of one or more items to be monitored; monitor a purchase price of the one or more selected items and the amount of loyalty points stored in the loyalty points account; determine that a difference between the purchase price of the one or more selected items and the amount of loyalty points drops below a threshold; and responsive to determining that the difference between the purchase price of the one or more selected items and the amount of loyalty points drops below the threshold, send, via the communications module and to the computing device, a signal causing the computing device to display a notification that includes a selectable option to apply the loyalty points to offset the purchase price.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

During an online shopping experience, a user may wish to use loyalty points to offset a purchase price of one or more items. The user may, however, not have enough loyalty points to reduce or offset the purchase price of the one or more items at the current purchase price.

The purchase price of the one or more items may be reduced by the merchant, for example, during a sale. The reduction of the purchase price may result in the user having enough loyalty points to offset the purchase price of the one or more items. The user may, however, be unaware of the reduction of the purchase price.

The amount of loyalty points in a loyalty points account of the user may increase. For example, the user may earn additional loyalty points and the additional loyalty points may be deposited into the loyalty points account. The increase in loyalty points may result in the user having enough loyalty points to offset the purchase price of the one or more items. The user may, however, be unaware of the increase in loyalty points. Accordingly, a system and method for generating a notification to offset a purchase price are described herein.

FIG. 1 is a schematic operation diagram illustrating an operating environment of an example embodiment. As shown, the system 100 includes a computing device 110 and a server computer system 120 coupled to one another through a network 130, which may include a public network such as the Internet and/or a private network. The computing device 110 and the server computer system 120 may be in geographically disparate locations. Put differently, the computing device 110 and the server computer system 120 may be located remote from one another.

The server computer system 120 may be associated with a financial institution, a value card provider such as for example a credit card provider, and/or a loyalty points provider.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The computing device 110 may be a laptop computer as shown in FIG. 1. However, the computing device 110 may be a computing device of another type such as for example a personal computer, a tablet computer, a notebook computer, a hand-held computer, a personal digital assistant, a portable navigation device, a mobile phone, a wearable computing device (e.g., a smartwatch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The server computer system 120 may be associated with or may communicate with a database 140 that stores account data. For example, the account data may be user or customer accounts and may include value account data and/or loyalty point data. The value account data may include one or more value accounts such as for example a bank account or a credit card account associated with the user. The loyalty point data may include an amount of loyalty points stored in a loyalty points account. The loyalty point data may be related to the value account data. For example, the loyalty point data may be based on or related to transactions made by the user on a particular credit card. The account data may additionally include any one or more of a personal name, geographic address, a telephone number, an email address, a date of birth, etc. The server computer system 120 may communicate with the database 140 directly or through the network 130. It will be appreciated that although the database 140 is shown as being associated with the server computer system 120, in another embodiment the database 140 may be separate from the server computer system 120 and may be associated with, for example, a third-party server. Further, the server computer system 120 may be associated with multiple databases.

The database 140 may store a list of items to be monitored in association with a particular account. For example, a list of items may be associated with a particular loyalty points account. As will be described in more detail below, the list of items to be monitored may be generated based on user selection of one or more items to be monitored. The list of items may identify each item using, for example, a uniform resource locator (URL) associated with a web page for purchasing the item and/or a stock keeping unit (SKU) of the item. The list of items may additionally include a current purchase price of each item. The current purchase price of the item may be obtained from, for example, the web page for purchasing the item or may be obtained directly from a merchant offering the item for sale. The list of items may additionally include a conversion rate for each item. The conversion rate may be a conversion rate of loyalty points to dollars and may be particular to each item. For example, for a particular item, the list may include a conversion rate of 100:1. The conversion rate of 100:1 indicates that every one hundred (100) loyalty points may be redeemed as one (1) dollar for that particular item. The conversion rate may be updated or changed at the request of the merchant offering the item for sale. As will be described in more detail, the list of items may be used to trigger the generation of a notification based on, for example, a change in current purchase price of one or more items.

The database 140 may also store a "whitelist" identifying merchants, items, and/or uniform resource locators (URLs) for which loyalty points can be redeemed. The merchants, items or URLs for which loyalty points can be redeemed may be associated with one or more third parties. For example, the whitelist may include a partner merchant defined by an agreement made between the financial institution, value card provider or loyalty points provider and the partner merchant.

The database 140 may also store a "blacklist" identifying merchants, items, and/or uniform resource locators (URLs) for which loyalty points cannot be redeemed. The merchants, items or URLs for which loyalty points cannot be redeemed may be associated with one or more third parties. For example, the blacklist may include an item offered by a partner merchant, where the item is on back-order or is only available in limited quantities.

The database 140 may also store a list that includes a list of merchants, items and/or URLs and an associated conversion rate for each particular merchant, item and/or URL. The conversion rate may be a conversion rate of loyalty points to dollars and may be particular to each of the listed merchants, items and/or URLs. For example, the list may include a partner merchant and a conversion rate of 100:1 for the partner merchant. The conversion rate of 100:1 indicates that every one hundred (100) loyalty points may be redeemed as one (1) dollar. The conversion rate may be updated or changed at the request of the partner merchant and this may be done, for example, during a sale or promotional event.

It will be appreciated that in embodiments, rather than the database 140 storing different lists for the whitelist, blacklist and conversion rate, the conversion rate may be included in the whitelist and/or blacklist. Further, it will be appreciated that multiple databases may be used. Further, the server computer system 120 may communicate with one or more third party servers associated with, for example, different merchants to obtain a whitelist, blacklist and/or conversion rate.

Figure 2:
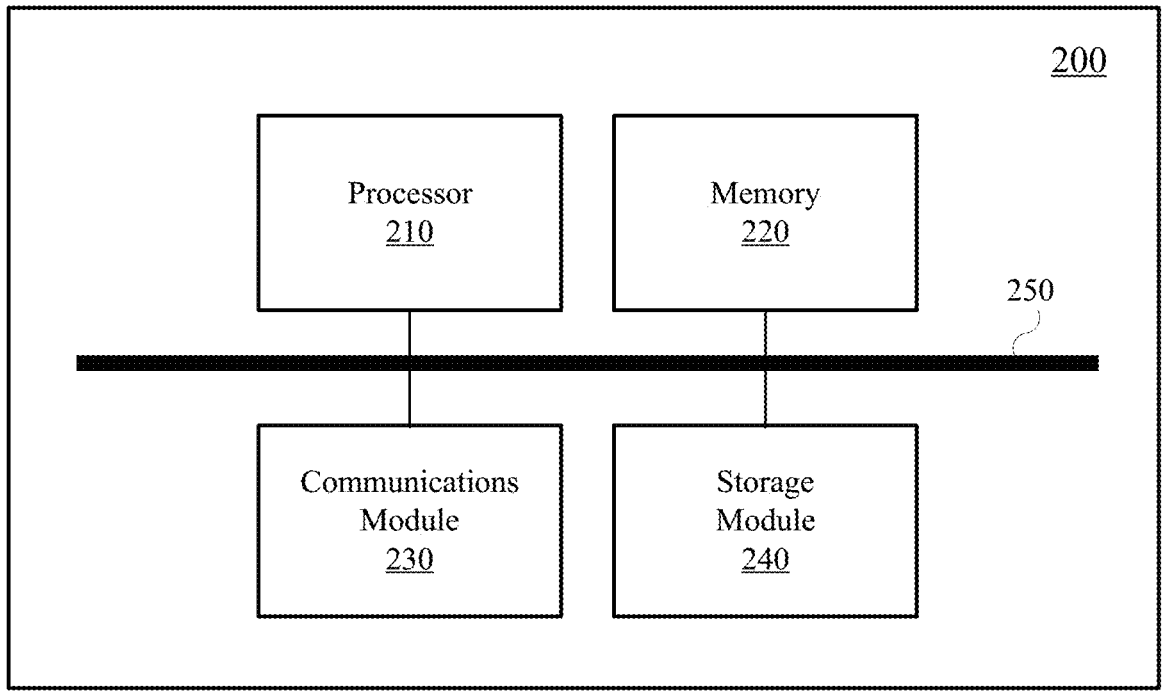
FIG. 2 is a high-level schematic diagram of an example computing device.

FIG. 2 is a high-level schematic diagram of a computer system 200. The computer system 200 may be the computing device 110 and/or the server computer system 120.

The computer system 200 includes a variety of modules. For example, as illustrated, the computer system 200 may include a processor 210, a memory 220, a communications module 230, and/or a storage module 240. Further, while not illustrated in FIG. 2, the computer system 200 may include an I/O module. As illustrated, the foregoing example modules of the computer system 200 are in communication over a bus 250. As such, the bus 250 may be considered to couple the various modules of the computer system 200 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the computer system 200.

The communications module 230 allows the computer system 200 to communicate with other computing devices and/or various communications networks such as, for example, the network 130. For example, the communications module 230 may allow the computer system 200 to send or receive communications signals. Communications signals may be sent or received according to one or more protocols or according to one or more standards. The communications module 230 may allow the computer system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the computer system 200 to communicate using near-field communication (NFC), via Wi-Fi™, using Bluetooth™ or via some combination of one or more networks or protocols. In some embodiments, all or a portion of the communications module 230 may be integrated into a component of the computer system 200. For example, the communications module 230 may be integrated into a communications chipset.

The I/O module is an input/output module. The I/O module allows the computer system 200 to receive input from and/or to provide input to components of the computer system 200 such as, for example, various input modules and output modules. For example, the I/O module may, as shown, allow the computer system 200 to receive input from and/or provide output to a display.

The storage module 240 allows data to be stored and retrieved. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in/from a database, such as the database 140 of FIG. 1 when the computer system is operating as the server computer system 120 of FIG. 1. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
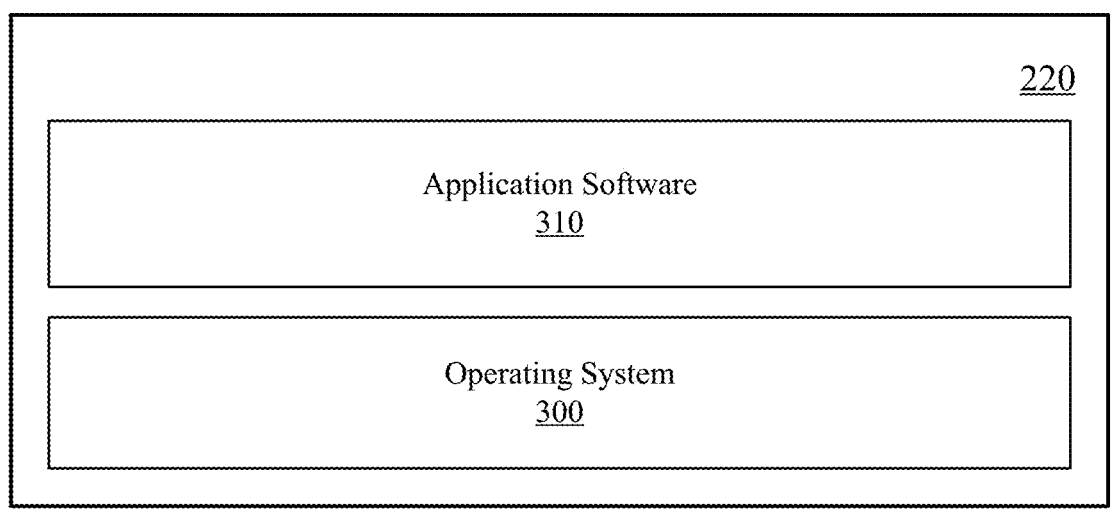
FIG. 3 shows a simplified organization of software components stored in a memory of the example computing device of FIG. 2.

FIG. 3 depicts a simplified organization of software components stored in the memory 220 of the computer system 200. As illustrated, these software components include an operating system 300 and an application software 310.

The operating system 300 is software. The operating system 300 allows the application software 310 to access the processor 210 (FIG. 2), the memory 220, the communications module 230, the I/O module, and the storage module 240 of the client computer system 200. The operating system 300 may be, for example, Google™ Android™, Apple™ iOS™, UNIX™, Linux™, Microsoft™ Windows™, Apple OSX™ or the like.

The application software 310 adapts the computer system 200, in combination with the operating system 300, to operate as a device for performing a specific function. For example, in at least some embodiments in which the computer system 200 functions as the computing device 110, the applications 410 may include a web browser. The web browser may include an Internet browser and/or may include a mobile application communicating via the Internet. In at least some such embodiments, the server computer system 120 may be a browser extension server that may provide a browser extension application to the computing device 110. The browser extension application may be configured to monitor an active web page associated with the web browser executing on the computing device 110. In at least some such embodiments, the server computer system 120 may be a browser plug-in server that may provide a browser plug-in application to the computing device 110. The browser plug-in application may be configured to monitor an active web page associated with the web browser executing on the computing device. The browser extension application and/or the browser plug-in application may be, for example, a Google Chrome extension that may be activated within the Google Chrome web browser. Other web browsers may be used and the browser extension application and/or browser plug-in application may be configured to be compatible with a particular web browser.

Through use of the browser extension application or browser plug-in application, the server computer system 120 provides a user of the computing device 110 an option to offset a purchase price using loyalty points held in one or more loyalty point accounts of the user. As will be described in more detail below, when the user does not have enough loyalty points to offset the purchase price of a particular item, the server computer system 120 provides the user of the computing device 110 an option to monitor the item until the user has enough loyalty points to offset the purchase price of the particular item or until a purchase price of the item is reduced.

Figure 4:
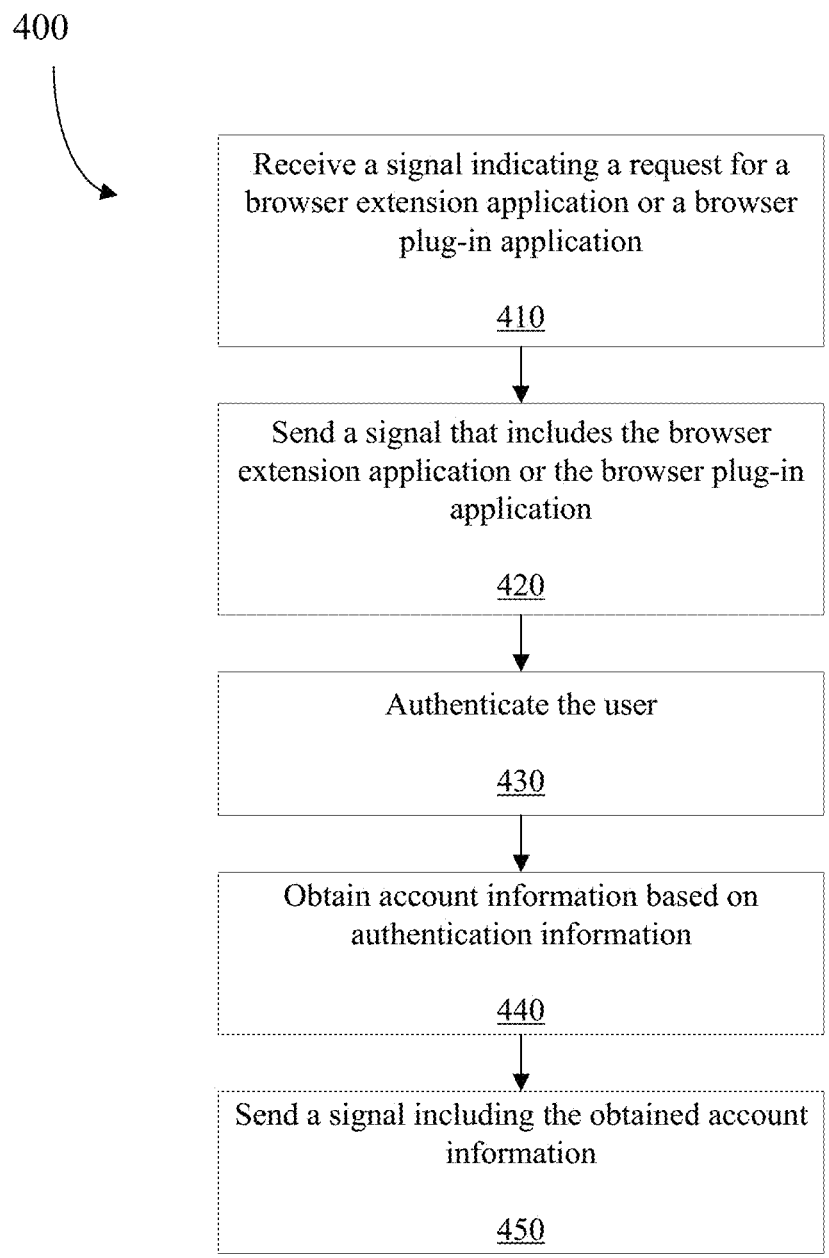
FIG. 4 is a flowchart showing operations performed by a server in providing a browser extension application or a browser plug-in application according to an embodiment.

The server computer system 120 provides the browser extension application or browser plug-in application to the computing device 110. FIG. 4 is a flowchart showing operations performed by the server computer system 120 in providing the browser extension application or browser plug-in application to the computing device 110 according to an embodiment. The operations may be included in a method 400 which may be performed, in whole or in part, by the server computer system 120. For example, computer-executable instructions stored in memory of the server computer system 120 may, when executed by one or more processors, configure the server computer system 120 to perform the method 400 or a portion thereof. The server computer system 120 may off-load some operations of the method 400 to the computing device 110.

The server computer system 120 receives, via the communications module and from the computing device 110, a signal indicating a request for the browser extension application or browser plug-in application (step 410). In this embodiment, the browser extension application or browser plug-in application may be selected by a user as an add-on through a web browser executing on the computing device 110. The web browser may be for example Google Chrome, Apple Safari, Mozilla Firefox, Microsoft Edge, Microsoft Explorer, etc.

For example, the user may open the web browser and may select a selectable option to download the browser extension application or browser plug-in application. The selectable option may be provided in a list of selectable options, each of which maybe associated with a recommended browser extension application or browser plug-in application. In response to the user selecting the selectable option, the computing device 110 sends a signal to the server computer system 120 indicating a request for the browser extension application or browser plug-in application.

The server computer system 120 sends, via the communications module and to the computing device 110, a signal that includes the browser extension application or browser plug-in application (step 420). The computing device 110 stores the browser extension application or browser plug-in application in memory. The browser extension application or browser plug-in application may remain in memory of the computing device 110 until it is uninstalled or removed by the user. The browser extension application or browser plug-in application is configured to monitor active web pages associated with the web browser executing on the computing device 110. In this manner, the browser extension application or browser plug-in application allows the computing device 110 to communicate with the server computer system 120.

As mentioned, the server computer system 120 is associated with a database 140 that stores account data. In this embodiment, the browser extension application or browser plug-in application requires the user to authenticate to permit the browser extension application or browser plug-in application to access their account data stored on the database 140. As such, once received by the computing device 110, the signal may further cause the browser extension application or browser plug-in application to display an interface requesting the user to authenticate by, for example, entering a username and password. It will be appreciated that other authentication methods may be used and may require the user to provide, for example, biometric data such as for example a fingerprint via an input device associated with the computing device 110.

The server computer system 120 authenticates the user (step 430). Specifically, in this embodiment the server computer system 120 receives, via the communication module and from the computing device 110, a signal that includes authentication information. The server computer system 120 compares the received authentication information to previously obtained authentication information stored in the database 140 and when it is determined that the received authentication information matches the authentication information stored in the database, the user is authenticated. For example, the server computer system 120 may compare the received username and password to a previously obtained username and password to authenticate the user.

When the user has been authenticated, the server computer system 120 obtains account information based on the authentication information (step 440). In this embodiment, the server computer system 120 obtains loyalty point data for the user by performing a lookup in the database 140 using, for example, the username received during authentication. As mentioned, the loyalty point data may include an amount of loyalty points stored in the loyalty points account.

The server computer system 120 sends, via the communications module and to the computing device 110, a signal including the obtained account information (step 450). As mentioned, the loyalty point data includes an amount of loyalty points stored in the loyalty points account. The user may view the loyalty point data through an interface associated with the browser extension application or browser plug-in application.

Figure 5:
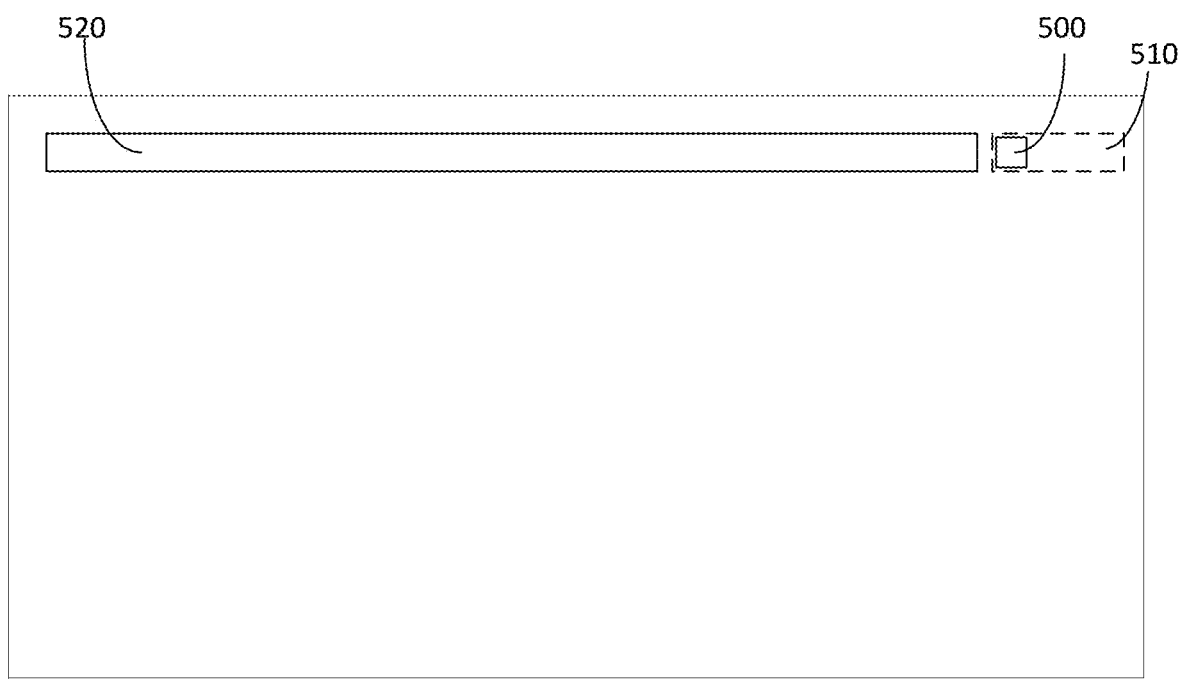
FIG. 5 is an example of an indicator displayed on a tool bar of a web browser executing on a computing device according to an embodiment.

Once the browser extension application or browser plug-in application is installed, an indicator indicating that the browser extension application or browser plug-in application is installed may be displayed on a tool bar of the web browser executing on the computing device 110. An example is shown in FIG. 5. As can be seen, an indicator 500 is displayed on a tool bar 510 of the web browser executing on the computing device 110. The address bar 520 is also shown.

Figure 6:
FIG. 6 is another example of an indicator displayed on a tool bar of a web browser executing on a computing device according to an embodiment.

When it is determined that the active web page meets predetermined criteria, such as for example determining that the active web page is eligible for loyalty point redemption, the server computer system 120 may send a signal causing the computing device to modify the indicator. For example, as shown in FIG. 6, the indicator 600 is displayed as a highlighted or illuminated icon. Put another way, the indicator 500 shown in FIG. 5 is highlighted as indicator 600 to indicate that the active web page meets the predetermined criteria. It will be appreciated that the signal may also cause the computing device 110 to output an audible alert indicating that the active web page meets the predetermined criteria. Other options are available to modify the indicator 500 to indicate that the active web page meets predetermined criteria may be used. For example, the color of the indicator may be changed. As another example, animations or graphics may be used such that the indicator may rotate, bounce, spin, sparkle or otherwise catch the attention of the user.

The indicator 600 may be selectable by the user. For example, the user may use an input device such as a mouse of the computing device 110 to select the indicator 600. In response to the user selecting the indicator 600, the computing device 110 may send a signal to the server computer system 120 indicating selection of the indicator 600. Responsive to receiving the signal indicating selection of the indicator 600, the server computer system 120 may send, via the communications module and to the computing device 110, a signal causing the computing device 110 to display, within the web browser, the amount of loyalty points stored in the loyalty points account. It will be appreciated that the indicator 500 may similarly be selected by the user and, in response, the computing device 110 may display the amount of loyalty points stored in the loyalty points account.

Figure 7:
FIG. 7 is another example of an indicator displayed on a tool bar of a web browser executing on a computing device according to an embodiment.

In another embodiment, the amount of loyalty points stored in the loyalty points account may be included or displayed with the indicator. An example is shown in FIG. 7. As can be seen, the indicator 700 includes the amount of loyalty points "10 k" available to the user. The indicator 700 may be modified in response to determining that the active web page meets predefined criteria in a manner similar to that described with reference to indicator 600.

In another embodiment, the server computer system 120 may convert the amount of loyalty points stored in the loyalty points account to an amount of money available to be used to offset the purchase price and the amount of money may be included or displayed with the indicator. For example, the server computer system 120 may determine a conversion rate for the active web page based on the list maintained by the database 140. Using the conversion rate, the server computer system 120 may calculate the amount of money available to be used to offset the purchase price for the active web page. For example, the conversion rate for the active web page may be 100:1 indicating that every one hundred (100) loyalty points may be redeemed as one (1) dollar. The user may have 10,000 loyalty points stored in the loyalty points account. As such, the amount of money available to be used to offset the purchase price may be calculated as 10,000/100=$100. In embodiments where the active web page is not eligible for loyalty point redemption or in embodiments where the server computer system 120 does not have a particular conversion rate for the active web page, a default conversion rate may be used.

Figure 8:
FIG. 8 is another example of an indicator displayed on a tool bar of a web browser executing on a computing device according to an embodiment.

The amount of money available to be used to offset the purchase price may be included or displayed with the indicator. An example is shown in FIG. 8. As can be seen, the indicator 800 includes the amount of money available to be used to offset the purchase price "$100" available to the user. In embodiments where the active web page does not satisfy the predetermined criteria and thus is not eligible for loyalty point redemption, the indicator 800 may not be illuminated and may display the amount of money available to be used to offset the purchase price based on the default conversion rate. In embodiments where the active web page does satisfy the predetermined criteria and thus is eligible for loyalty point redemption, the indicator 800 may be modified in a manner similar to that described with reference to indicator 600.

Figure 9:
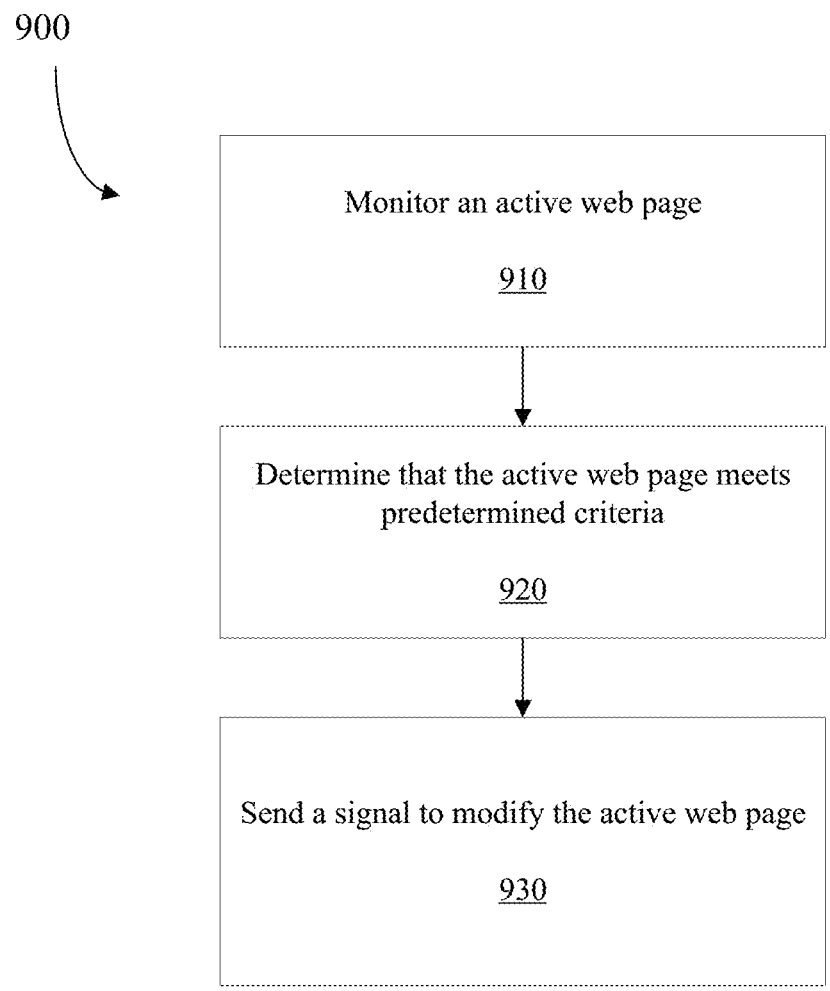
FIG. 9 is a flowchart showing operations performed by a server in modifying an active web page according to an embodiment.

Using the browser extension application or browser plug-in application provided to the computing device 110, the server computer system 120 may be configured to modify a web page active within the web browser executing on the computing device 110. The web page active within the web browser may be referred to as an active web page. The active web page may be modified by, for example, overlaying one or more selectable options on the web page. FIG. 9 is a flowchart showing operations performed by the server computer system 120 in modifying an active web page according to an embodiment. The operations may be included in a method 900 which may be performed, in whole or in part, by the server computer system 120. For example, computer-executable instructions stored in memory of the server computer system 120 may, when executed by one or more processors, configure the server computer system 120 to perform the method 900 or a portion thereof. The server computer system 120 may off-load some operations of the method 900 to the computing device 110. The method 900 may begin responsive to the user opening the web browser on the computing device 110.

The server computer system 120 monitors the active web page (step 910). In this embodiment, the server computer system 120 monitors the active web page through use of the browser extension application or browser plug-in application provided during method 400 described herein. The server computer system 120 may monitor the active web page based on at least part of a Uniform Resource Locator (URL) associated with the active web page or based on a page source of the active web page. The page source may include, for example, the Hypertext Markup Language (HTML) programming code of the active web page.

Figure 10:
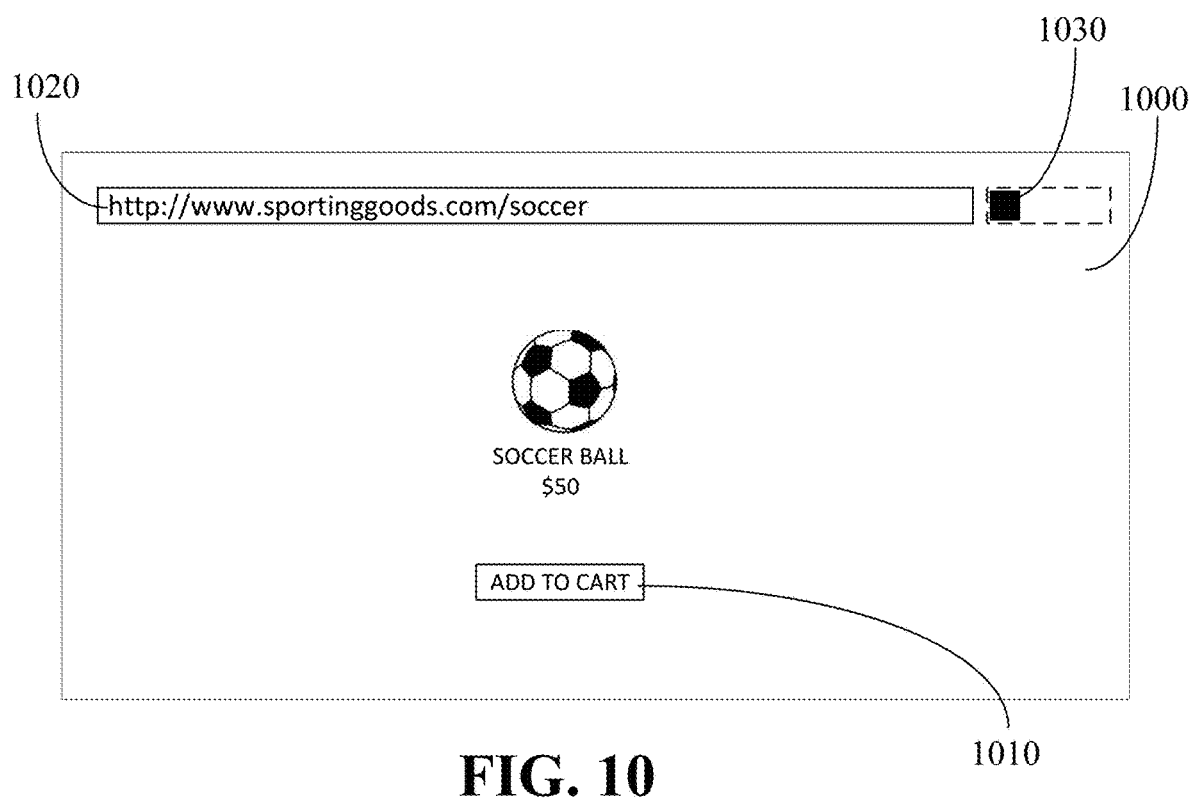
FIG. 10 is an example active web page according to an embodiment.

An example active web page is shown in FIG. 10. As can be seen, the active web page 1000 includes a selectable option 1010 associated with purchasing the particular item. The address bar 1020 displays the URL of the active web page which in this example is www.sportinggoods.com/soccer. It will be appreciated that the active web page shown in FIG. 10 is an example and in other examples the active web page may include multiple items displayed in an ordered fashion.

The server computer system 120 determines that the active web page meets predetermined criteria (step 920). In this embodiment, the predetermined criteria includes determining that the active web page is found in a whitelist, determining that a particular item is displayed on the active web page and/or determining that the active web page is associated with a particular merchant.

For example, the server computer system 120 may compare at least a portion of the URL of the active web page to a whitelist that includes URLs for which loyalty points can be redeemed. When it is determined that the at least a portion of the URL is found in the whitelist, the server computer system 120 determines that the active web page meets predetermined criteria. In this example, the portion of the URL may identify that the active web page is associated with a partner merchant or that the active web page is an e-commerce website.

As another example, the server computer system 120 may analyze the page source of the active web page to identify one or more items contained therein. The server computer system 120 may compare the one or more items to a whitelist that includes items for which loyalty points can be redeemed. When it is determined that one or more of the items are found in the whitelist, the server computer system 120 determines that the active web page meets predetermined criteria.

In the example shown in FIG. 10, the server computer system 120 determines that the active web page meets predefined criteria and as such an indicator 1030 is displayed. The indicator may be displayed in a manner similar to indicator 600 described herein.

The server computer system 120 sends, via the communications module and to the computing device, a signal to modify the active web page (step 930).

The active web page may be modified to display one or more selectable options associated with reducing or offsetting the purchase price of one or more items using loyalty points from the loyalty points account. For example, one or more selectable options may be displayed on the active web page.

The one or more selectable options may be based on whether or not the user has enough loyalty points to offset or reduce the purchase price of one or more particular items. For example, the server computer system 120 may determine a conversion rate of loyalty points to dollars for the active web page based on the list maintained by the database 140. Using the conversion rate, the server computer system 120 may determine an amount of loyalty points required to offset the purchase price of one or more items. For example, a particular item displayed on the active web page may have a purchase price of $100 and a conversion rate for the active web page may be 100:1 (100 loyalty points for every $1). As such, the server computer system 120 may determine that 10,000 loyalty points are required to offset the purchase price for the particular item. Put another way, 10,000 loyalty points are required to purchase the particular item using only loyalty points.

The server computer system 120 may compare the amount of loyalty points required to purchase the particular item to the amount of loyalty points stored in the loyalty points account to determine which selectable option to be displayed for the particular item. Based on the comparison, the server computer system 120 may determine that the amount of loyalty points required to purchase the particular item is less than or equal to the amount of loyalty points stored in the loyalty points account or the server computer system 120 may determine that the amount of loyalty points required to purchase the particular item is greater than the amount of loyalty points stored in the loyalty points account.

Responsive to determining that the amount of loyalty points required to purchase the particular item is less than or equal to the amount of loyalty points stored in the loyalty points account, the server computer system 120 may determine that a selectable option associated with purchasing the particular item using loyalty points is to be displayed and the server computer system 120 may modify the active web page accordingly.

Figure 11:
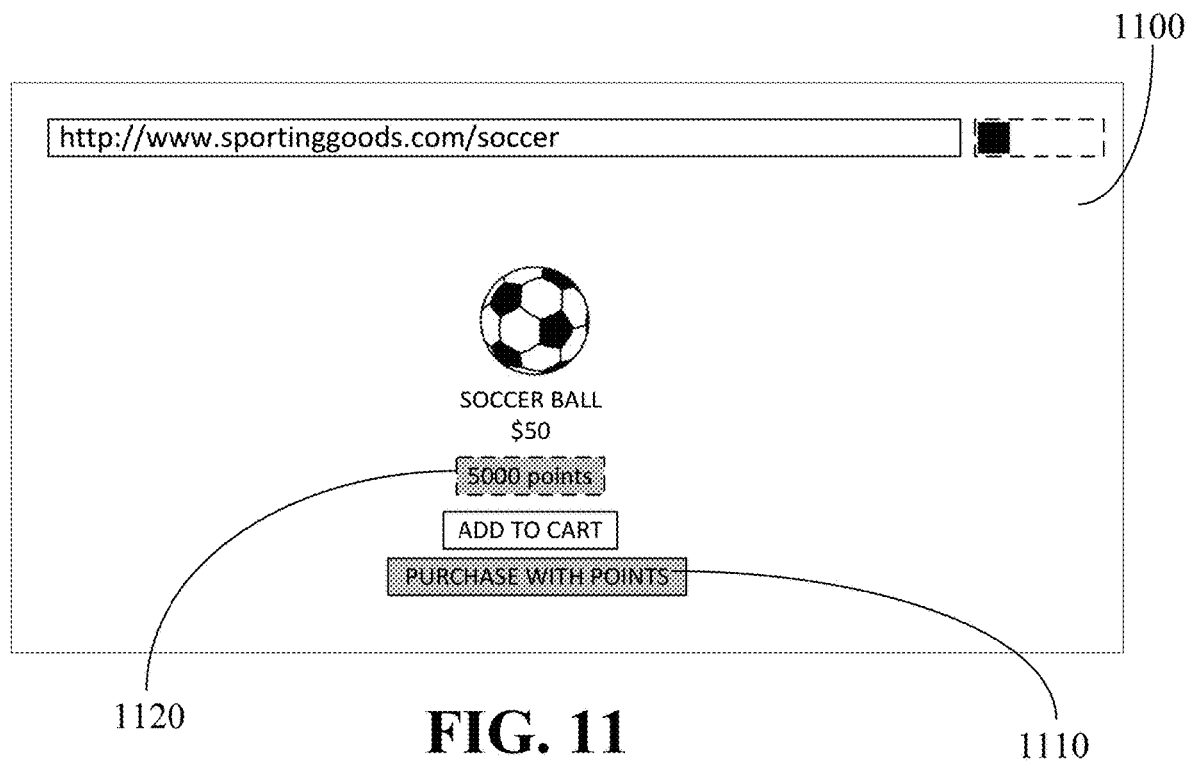
FIG. 11 is an example modified active web page according to an embodiment.

An example modified active web page 1100 is shown in FIG. 11. The modified active web page 1100 is similar to active web page 1000 with the following exceptions. In this example, the server computer system 120 has determined that a selectable option associated with purchasing the particular item using loyalty points is to be displayed and as such the active web page 1000 has been modified by the server computer system 120 to display a selectable option 1110 associated with purchasing the particular item using loyalty points. The server computer system 120 has also modified the active web page to display information 1120 indicating the amount of loyalty points required to offset the purchase price of the particular item using loyalty points. In this example, 5000 points are required to offset the purchase price of the particular item.

Figure 12:
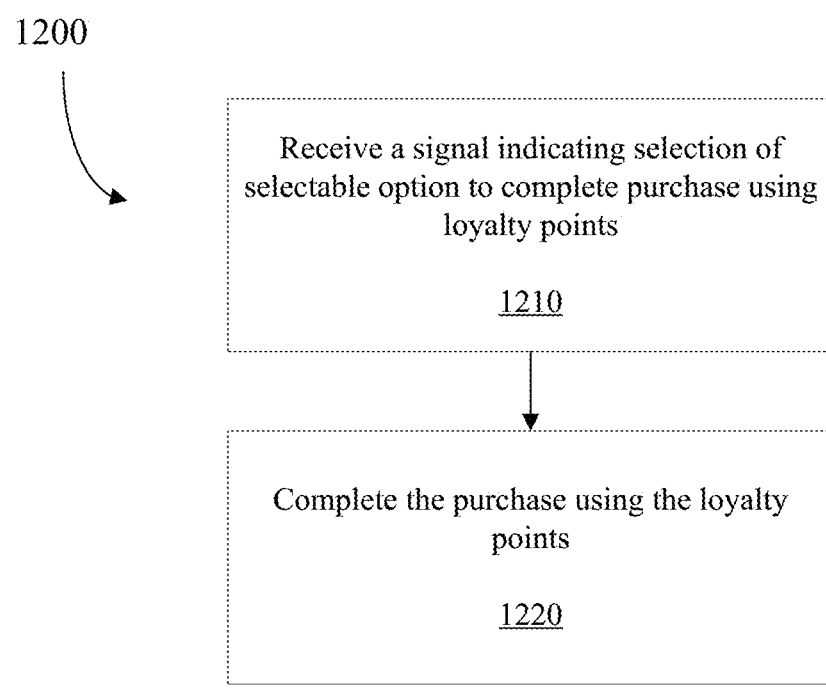
FIG. 12 is a flowchart showing operations performed by a server in completing a purchase using loyalty points according to an embodiment.

The user may select the selectable option 1110 to purchase the particular item using loyalty points. To complete the purchase, the server computer system 120 may perform operations to complete the purchase using loyalty points. FIG. 12 is a flowchart showing operations performed by the server computer system 120 in completing the purchase using loyalty points. The operations may be included in a method 1200 which may be performed, in whole or in part, by the server computer system 120. For example, computer-executable instructions stored in memory of the server computer system 120 may, when executed by one or more processors, configure the server computer system 120 to perform the method 1200 or a portion thereof. The server computer system 120 may off-load some operations of the method 1200 to the computing device 110.

The server computer system 120 receives, via the communications module and from the computing device 110, a signal indicating selection of the selectable option 1110 to complete the purchase using loyalty points (step 1210).

After receiving the signal indicating selection of the selectable option 1110, the server computer system 120 completes the purchase using the loyalty points (step 1220). The server computer system 120 may send a signal to the database 140 to debit the loyalty points account by the amount of loyalty points required to offset the purchase price. The server computer system 120 may also send a signal to a server associated with the merchant selling the particular item confirming that the purchase has been completed. The server associated with the merchant may then ship or otherwise provide the purchased item to the user based on, for example, shipping information. The shipping information may be obtained automatically from the database 140 by the server computer system 120 and may be provided to the server associated with the merchant. In this manner, loyalty points are applied to offset the purchase price of the particular item.

As mentioned, the server computer system 120 may compare the amount of loyalty points required to purchase the particular item to the amount of loyalty points stored in the loyalty points account to determine which selectable option to be displayed for the particular item. Based on the comparison, the server computer system 120 may determine that the amount of loyalty points required to purchase the particular item is less than or equal to the amount of loyalty points stored in the loyalty points account or the server computer system 120 may determine that the amount of loyalty points required to purchase the particular item is greater than the amount of loyalty points stored in the loyalty points account.

Responsive to determining that the amount of loyalty points required to purchase the particular item is greater than the amount of loyalty points stored in the loyalty points account, the server computer system 120 may determine that a selectable option associated with monitoring the particular item is to be displayed and the server computer system 120 may modify the active web page accordingly.

Figure 13:
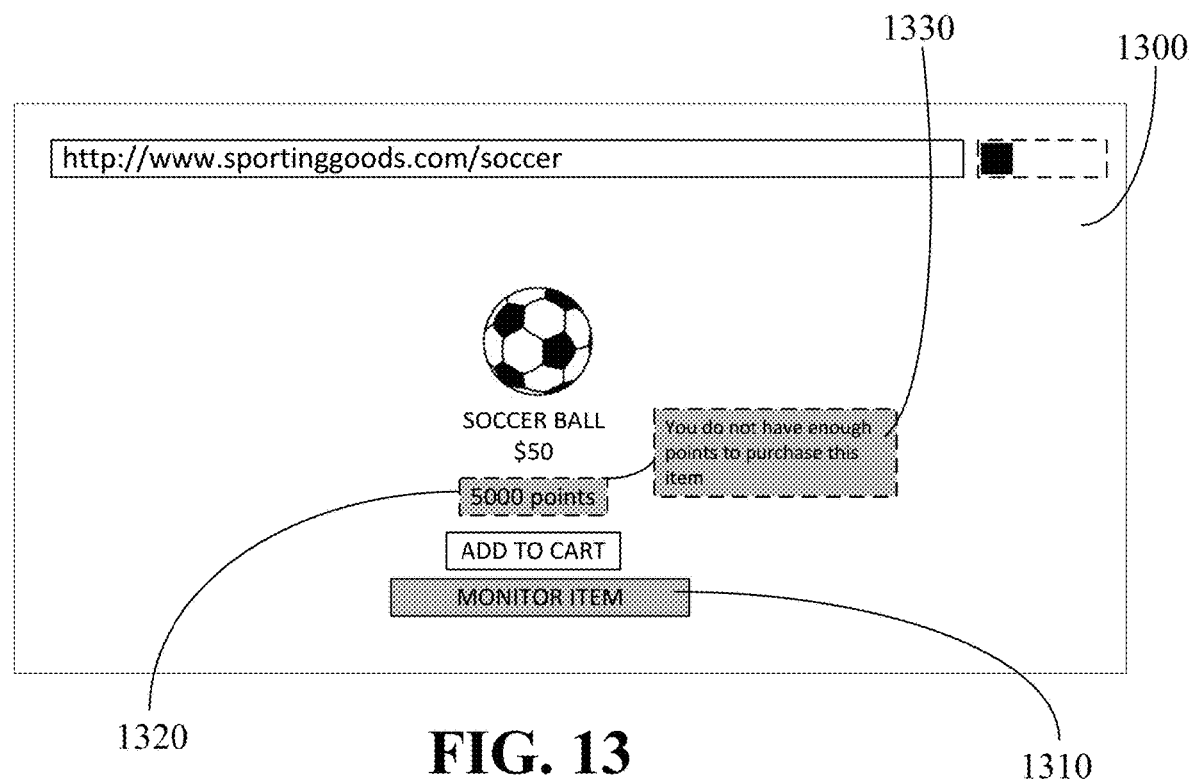
FIG. 13 is another example modified active web page according to an embodiment.

An example modified active web page 1300 is shown in FIG. 13. The modified active web page 1300 is similar to active web page 1000 with the following exceptions. In this example, the server computer system 120 has determined that a selectable option associated with monitoring the particular item is to be displayed and as such the active web page 1000 has been modified by the server computer system 120 to display a selectable option 1310 associated with monitoring the particular item. The server computer system 120 has also modified the active web page to display information 1320 indicating the amount of loyalty points required to offset the purchase price of the particular item using loyalty points. The server computer system 120 has also modified the active web page to display a message 1330 indicating that the user does not have enough loyalty points to offset the purchase price of the particular item. It will be appreciated that the message 1330 may include the current amount of loyalty points stored in the loyalty point account and/or may include a difference between the current amount of loyalty points stored in the loyalty point account and the amount of loyalty points required to offset the purchase price of the particular item. For example, the message 1330 may inform the user that "You need to earn 500 more points to purchase this item using loyalty points."

As mentioned, the active web page may include multiple items and as such the active web page may be modified such that each item displayed on the active web page may have an associated selectable option based on whether or not the user has enough loyalty points to offset the price of the particular item. For example, the active web page may be modified such that a first item displayed on the active web page may have a selectable option associated with purchasing the first item using loyalty points and a second item displayed on the active web page may have a selectable option associated with monitoring the second item.

Figure 14:
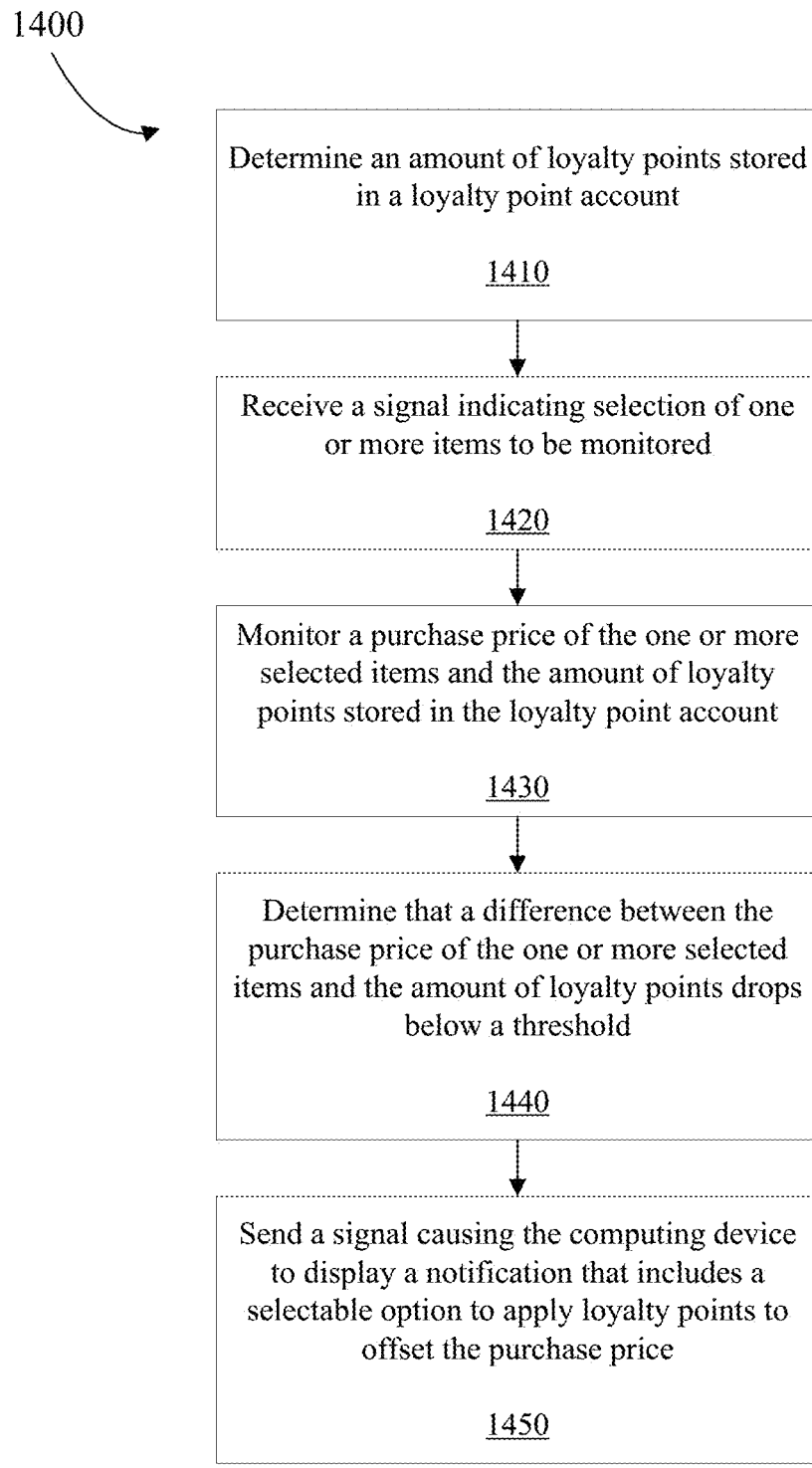
FIG. 14 is a flowchart showing operations performed by a server in generating a notification to offset a purchase price according to an embodiment.

The user may select the selectable option 1310 to monitor the particular item until the user has enough loyalty points to offset the purchase price of the particular item or until a purchase price of the item is reduced. Based on the monitoring, the server computer system 120 may send notifications to the computing device 110 to offset the purchase price of the one or more items. FIG. 14 is a flowchart showing operations performed by the server computer system 120 in sending notifications to offset the purchase price according to an embodiment. The operations may be included in a method 1400 which may be performed, in whole or in part, by the server computer system 120. For example, computer-executable instructions stored in memory of the server computer system 120 may, when executed by one or more processors, configure the server computer system 120 to perform the method 1400 or a portion thereof. The server computer system 120 may offload some operations of the method 1400 to the computing device 110.

The server computer system 120 determines an amount of loyalty points stored in a loyalty points account (step 1410). In this embodiment, the server computer system 120 may determine the amount of loyalty points stored in the loyalty points in manners similar to that described herein with reference to method 400. It will be appreciated that the amount of loyalty points stored in the loyalty points account may be continuously determined. For example, the server computer system 120 may determine the amount of loyalty points stored in the loyalty points account periodically or. The amount of loyalty points stored in the loyalty points account may be determined in response to an action. For example, the server computer system 120 may send a request for updated loyalty points data in response to the user opening the web browser on the computing device 110. As another example, the server computer system 120 may send a request for updated loyalty points data in response to the browser extension application and/or the browser plug-in application opening within the web browser on the computing device. As another example, the server computer system 120 may monitor a data record stored in the database 140 associated with the loyalty points account.

The server computer system 120 receives, via the communications module and from the computing device 110, a signal indicating selection of one or more items to be monitored (step 1420). As mentioned, the server computer system 120 may modify the active web page to include one or more selectable options associated with monitoring one or more items. In response to selection of the one or more selectable options, the computing device 110 sends, to the server computer system 120, a signal indicating selection of the one or more items to be monitored. In response, the server computer system 120 receives the signal indicating selection of the one or more items to be monitored. The signal may include information identifying the one or more items to be monitored. For example, the signal may include the URL associated with the one or more items to be monitored. Based on the received signal, the server computer system 120 may determine or obtain a current purchase price of the one or more items to be monitored. For example, the server computer system 120 may engage a screen scraping module to obtain the price from the web page associated with the URL. As another example, the server computer system 120 may analyze the HTML code of the web page associated with the URL to parse one or more elements associated with the current purchase price of the one or more items. As yet another example, the server computer system 120 may engage one or more application programming interfaces (APIs) associated with obtaining a current purchase price of one or more items.

The server computer system 120 may convert the purchase price to an amount of loyalty points required to offset the purchase price of the one or more items to be monitored and this may be done using a particular conversion rate based on the merchant, website and/or item selected, as described above.

Responsive to receiving the signal indicating selection of the one or more items to be monitored, the server computer system 120 may send a signal to add the one or more items to the list of items to be monitored maintained by the database 140. The list of items may include, for example, the URL associated with the one or more items, the purchase price and/or the amount of loyalty points required to offset the purchase price. The list of items may additionally include a conversion rate used to convert the purchase price to the amount of loyalty points required to offset the purchase price. As mentioned, the list of items to be monitored is associated with the loyalty points account.

The server computer system 120 monitors a purchase price of the one or more selected items and the amount of loyalty points stored in the loyalty points account (step 1430).

In this embodiment, the server computer system 120 may continuously monitor the purchase price of the one or more selected items and the amount of loyalty points stored in the loyalty points account. The purchase price may be converted to an amount of loyalty points required to offset the purchase price and this may be done using a particular conversion rate based on the merchant, website and/or item, as described above.

The server computer system 120 determines that a difference between the purchase price of the one or more selected items and the amount of loyalty points drops below a threshold (step 1440). In this embodiment, the threshold may be zero (0).

Responsive to a change in purchase price of a particular item and/or a change in an amount of loyalty points stored in the loyalty points account, the server computer system 120 determines the difference between the purchase price and the amount of loyalty points. For example, the server computer system 120 may convert the purchase price to an amount of loyalty points required to offset the purchase price of the particular item using the particular conversion rate. The server computer system 120 may then compare the amount of loyalty points required to offset the purchase price to the amount of loyalty points stored in the loyalty points account.

As an example, during the comparison, the amount of loyalty points stored in the loyalty points account may be subtracted from the amount of loyalty points required to offset the purchase price and when the difference drops below the threshold it is determined that the user has enough loyalty points to offset the purchase price of the selected one or more items.

Responsive to determining that the difference between the purchase price of the one or more selected items and the amount of loyalty points drops below the threshold, the server computer system 120 sends, via the communications module and to the computing device 110, a signal causing the computing device to display a notification that includes a selectable option to apply loyalty points to offset the purchase price (step 1450).

Responsive to determining that the user has enough loyalty points to offset the purchase price of the selected one or more items, the server computer system 120 sends a signal causing the computing device to display a notification indicating that the user has enough loyalty points to purchase the one or more selected items. The notification includes a selectable option that, when selected, causes the computing device 110 to send a signal to the server computer system 120 to apply the loyalty points to offset the purchase price.

Prior to sending the notification, the server computer system 120 may determine whether or not the computing device 110 has an active web session within the web browser executing thereon. Put another way, the server computer system 120 may select which notification is to be sent to the computing device 110 based on whether or not the computing device 110 has an active web session. The server computer system 120 may determine whether or not the computing device 110 has an active web session by determining, for example, that the browser extension application or the browser plug-in application is active on the computing device 110.

Responsive to determining that the computing device 110 has an active web session within the web browser executing thereon, the server computer system 120 may send a signal such that the notification is displayed within the web browser. The signal may be sent via the browser extension application or browser plug-in application.

Figure 15:
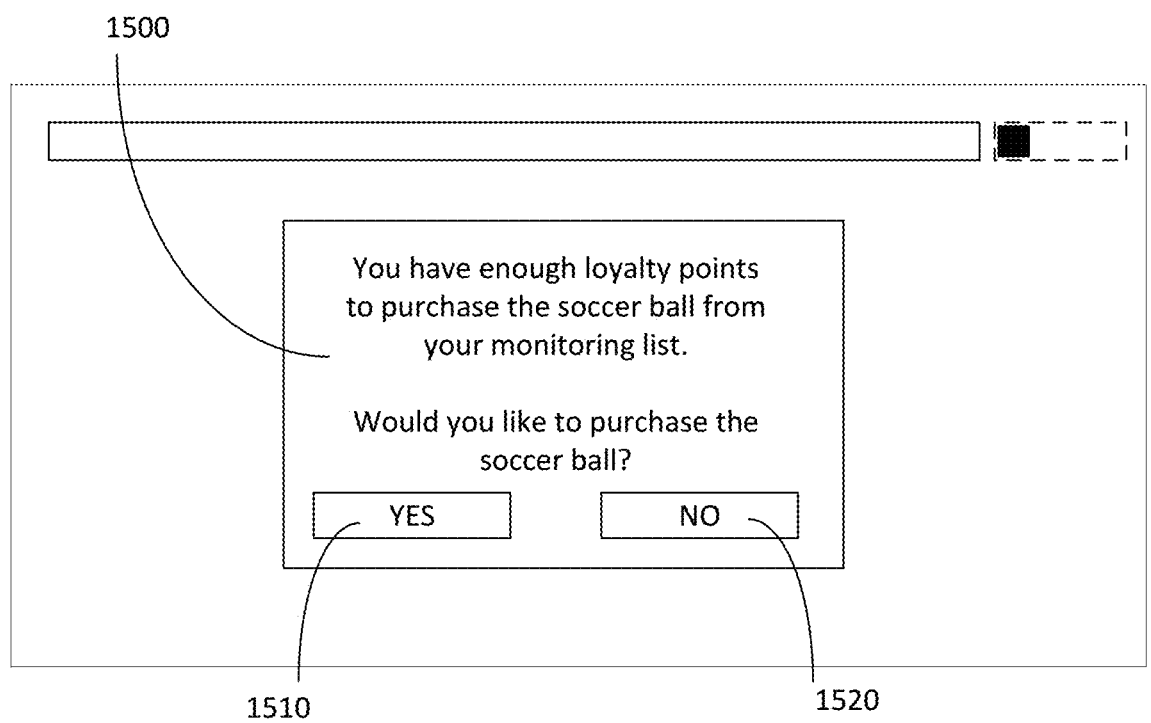
FIG. 15 is an example notification according to an embodiment.

An example notification 1500 is shown in FIG. 15. As can be seen, the notification 1500 is displayed such that it overlaps the active web page displayed on the computing device 110. The notification 1500 includes a message informing the user that they now have enough loyalty points to purchase one or more items from their monitoring list. The notification 1500 includes a selectable option 1510 that, when selected, causes the computing device 110 to send a signal to the server computer system 120 to apply the loyalty points to offset the purchase price. The notification 1500 includes a selectable option 1520 that, when selected, causes the computing device 110 to send a signal to the server computer system 120 indicating that the user would not like to purchase the item using loyalty points.

Responsive to receiving the signal to apply loyalty points to offset the purchase price, the server computer system 120 may complete the purchase without further input from the user. For example, the server computer system 120 may automatically complete a check-out process on behalf of the user and may send a signal to debit the amount of loyalty points required to offset the purchase price from the loyalty points account of the user. The server computer system 120 may complete the purchase in a manner similar to method 1200 described above.

Responsive to receiving the signal indicating that the user would not like to purchase the item using loyalty points, the server computer system 120 may remove the item from the monitoring list. The server computer system 120 may, however, send a signal causing the computing device 110 to display a notification that includes a selectable option to remove the item from the monitoring list. For example, the notification may ask the user if they would like to remove the item from the monitoring list and may include a selectable option "yes" to remove the item from the monitoring list and a selectable option "no" to keep the item on the monitoring list. The server computer system 120 may remove the item or keep the item on the monitoring list based on which selectable option is selected by the user.

Responsive to determining that the computing device 110 does not have an active web session within the web browser executing thereon, the server computer system 120 may send a signal such that the notification is provided in an email message or a text message. The email message or text message may be send using account information of the user. For example, the server computer system 120 may obtain the email address or phone number of the user from the database 140 and may automatically send the email message or text message using the obtained email address or phone number, respectively. The email message may include a selectable option that, when selected, causes the computing device 110 to send a signal to the server computer system 120 to apply the loyalty points to offset the purchase price in a manner similar to that described herein. The text message may request that the user submit a reply text message indicating whether or not the user would like to complete the purchase. For example, the text message may include a message "Please reply with 'YES" if you would like to complete the purchase."

It will be appreciated that the email message or the text message may be sent even when it is determined that the computing device 110 has the active web session. For example, the server computer system 120 may send a signal causing the notification to be displayed within the active web session and may send a signal causing the notification to be provided in an email message or a text message.

It will be appreciated that the notification may include additional information such as for example the amount of loyalty points required to offset the purchase price of the one or more items and/or the amount of loyalty points stored in the loyalty points account. The notification may additionally or alternatively provide information related to what event caused the notification to be sent. For example, the notification may indicate that "The price of the soccer ball you have been monitoring has dropped from $50 to $40. You now have enough loyalty points to purchase the soccer ball." As another example, the notification may indicate that "You received a deposit of 5000 loyalty points into your loyalty points account. You now have enough loyalty points to purchase the soccer ball."

Although in embodiments described herein examples are provided where one item is being monitored, in other examples multiple items may be monitored. In these examples, the server computer system 120 may determine that the user has enough loyalty points to offset the purchase price of multiple items and as such the notification may include information identifying that the user can now purchase the multiple items using loyalty points. The notification may include a list of the multiple items and the user may select one or more of the items to purchase using the loyalty points. In this manner, the user may choose which item(s) to purchase using the loyalty points and in response to the user providing this information, the server computer system 120 may complete the purchase of the item(s).

Although in embodiments the server computer system 120 is described as monitoring a purchase price of the one or more selected items and the amount of loyalty points stored in the loyalty points account, the server computer system 120 may additionally monitor a particular conversion rate based on the merchant, website and/or item. The server computer system 120 may determine a change in the particular conversion rate. For example, the merchant may wish to provide a promotional conversion rate of loyalty points to dollars. Responsive to determining the change in the particular conversion rate, the server computer system 120 may determine that the difference between the purchase price of the one or more selected items and the amount of loyalty points may drop below the threshold. As a result, the user may have enough loyalty points in the loyalty points account to offset the purchase price of one or more of the selected items. Put another way, by changing the conversion rate of loyalty points to dollars, the amount of loyalty points required to offset the purchase price of one or more items may be reduced and the server computer system 120 may send a notification as described above.

Although in embodiments use of a browser extension application or browser plug-in application are described, it will be appreciated that the above described methods and systems may be implemented in the form of a mobile application. Put another way, a mobile application may be installed on the computing device and may be used to communicate with the server computer system to perform methods and systems described herein.

Although in embodiments the purchase price is described as being in dollars, it will be appreciated that the purchase price may be in loyalty points. For example, the server computer system 120 may obtain an amount of loyalty points required to purchase one or more items from a particular merchant. The amount of loyalty points required may be unrelated to the actual value of the one or more items. For example, a first particular item may have a suggested retail price of $50 and may be purchased using 10000 loyalty points. A second particular item may have a suggested retail price of $1000 and may be purchased using 5000 loyalty points. In this manner, merchants may select the particular amount of loyalty points required to purchase an item as desired.

The methods described above may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server computer system comprising:
a communications module;
a processor coupled with the communications module; and
a memory coupled to the processor and storing processor-executable instructions which, when executed by the processor, configure the processor to:
  determine an amount of loyalty points stored in a loyalty points account;
  during an active web session within a web browser executing on the computing device:
    determine that a first web page active within the web browser is not eligible for loyalty point redemption;
    update an indicator displayed on a toolbar of the web browser to indicate that the first web page active within the web browser is not eligible for loyalty point redemption by at least one of causing the indicator to not be illuminated or highlighted, causing the indicator to be displayed in a first colour, or causing the indicator to not be animated;
    determine that a second web page active within the web browser is eligible for loyalty point redemption;
    obtain a conversion rate of loyalty points to dollars for the second web page active within the web browser and determine, based on the amount of loyalty points stored in the loyalty points account and the conversion rate for the second web page active within the web browser, an amount of dollars available to be redeemed on the second web page active within the web browser;
    update the indicator displayed on the toolbar of the web browser to indicate that the second web page active within the web browser is eligible for loyalty point redemption by at least one of causing the indicator to be illuminated or highlighted, causing the indicator to be displayed in a second colour that is different than the first colour, or causing the indicator to be animated, and to indicate the amount of dollars available to be redeemed on the second web page active within the web browser;
    send, via the communications module and to a computing device, a signal causing one or more selectable options to be displayed on the second web page active within the web browser, each selectable option displayed adjacent to a particular item and selectable to indicate selection of the particular item to be monitored; and
    receive, via the communications module and from the computing device, a signal indicating selection of one or more of the selectable options indicating selection of one or more items to be monitored;

monitor a purchase price of the one or more selected items and the amount of loyalty points stored in the loyalty points account;
determine that a difference between the purchase price of the one or more selected items and the amount of loyalty points drops below a threshold; and
responsive to determining that the difference between the purchase price of the one or more selected items and the amount of loyalty points drops below the threshold, send, via the communications module and to the computing device, a signal causing the computing device to display a notification that includes a selectable option to apply the loyalty points to offset the purchase price.

2. The server computer system of claim 1, wherein the processor-executable instructions, when executed by the processor, further configure the processor to:
determine that the computing device has the active web session within the web browser; and
responsive to determining that the computing device has the active web session within the web browser, send the signal causing the computing device to display the notification within the web browser.

3. The server computer system of claim 1, wherein the processor-executable instructions, when executed by the processor, further configure the processor to:
determine that the computing device does not have the active web session within the web browser; and
responsive to determining that the computing device does not have the active web session, send the signal causing the computing device to display the notification as one of an email message or a text message.

4. The server computer system of claim 1, wherein the processor-executable instructions, when executed by the processor, further configure the processor to:
receive, via the communications module and from the computing device, a signal indicating selection of the selectable option to apply loyalty points to offset the purchase price; and
responsive to receiving the signal indicating selection of the selectable option to apply loyalty points to offset the purchase price, complete a purchase of the one or more selected items using the loyalty points.

5. The server computer system of claim 1, wherein the indicator displayed on the toolbar of the web browser includes a selectable indicator.

6. The server computer system of claim 5, wherein the processor-executable instructions, when executed by the processor, further configure the processor to:
receive, via the communications module and from the computing device, a signal indicating selection of the selectable indicator; and
responsive to receiving the signal indicating selection of the selectable indicator, send, via the communications module and to the computing device, a signal causing the computing device to display, within the web browser, the amount of loyalty points stored in the loyalty points account.

7. The server computer system of claim 6, wherein the signal causing the computing device to display the amount of loyalty points stored in the loyalty points account further causes the computing device to display the one or more selected items.

8. The server computer system of claim 1, wherein the processor-executable instructions, when executed by the processor, further configure the processor to:
monitor the conversion rate of loyalty points to dollars; determine a change in the conversion rate of loyalty points to dollars; and
responsive to determining the change in the conversion rate of loyalty points to dollars, determine that the difference between the purchase price of the one or more selected items and the amount of loyalty points drops below the threshold.

9. A computer-implemented method comprising:
determining an amount of loyalty points stored in a loyalty points account;
during an active web session within a web browser executing on a computing device:
determining that a first web page active within the web browser is not eligible for loyalty point redemption;
updating an indicator displayed on a toolbar of the web browser to indicate that the first web page active within the web browser is not eligible for loyalty point redemption by at least one of causing the indicator to not be illuminated or highlighted, causing the indicator to be displayed in a first colour, or causing the indicator to not be animated;
determining that a second web page active within the web browser is eligible for loyalty point redemption;
obtaining a conversion rate of loyalty points to dollars for the second web page active within the web browser and determining, based on the amount of loyalty points stored in the loyalty points account and the conversion rate for the second web page active within the web browser, an amount of dollars available to be redeemed on the second web page active within the web browser;
updating the indicator displayed on the toolbar of the web browser to indicate that the second web page active within the web browser is eligible for loyalty point redemption by at least one of causing the indicator to be illuminated or highlighted, causing the indicator to be displayed in a second colour that is different than the first colour, or causing the indicator to be animated, and to indicate the amount of dollars available to be redeemed on the second web page active within the web browser;
sending, via a communications module and to the computing device, a signal causing one or more selectable options to be displayed on the second web page active within the web browser, each selectable option displayed adjacent to a particular item and selectable to indicate selection of the particular item to be monitored; and
receiving, via the communications module and from the computing device, a signal indicating selection of one or more of the selectable options indicating selection of one or more items to be monitored;
monitoring a purchase price of the one or more selected items and the amount of loyalty points stored in the loyalty points account;
determining that a difference between the purchase price of the one or more selected items and the amount of loyalty points drops below a threshold; and
responsive to determining that the difference between the purchase price of the one or more selected items and the amount of loyalty points drops below the threshold, sending, via the communications module and to the computing device, a signal causing the computing device to display a notification that includes a selectable option to apply the loyalty points to offset the purchase price.

10. The computer-implemented method of claim 9, further comprising:
determining that the computing device has the active web session within the web browser; and
responsive to determining that the computing device has the active web session within the web browser, sending the signal causing the computing device to display the notification within the web browser.

11. The computer-implemented method of claim 9, further comprising:
determining that the computing device does not have the active web session within the web browser; and
responsive to determining that the computing device does not have the active web session, sending the signal causing the computing device to display the notification as one of an email message or a text message.

12. The computer-implemented method of claim 9, further comprising:
receiving, via the communications module and from the computing device, a signal indicating selection of the selectable option to apply loyalty points to offset the purchase price; and
responsive to receiving the signal indicating selection of the selectable option to apply loyalty points to offset the purchase price, completing a purchase of the one or more selected items using the loyalty points.

13. The computer-implemented method of claim 9, wherein the indicator displayed on the toolbar of the web browser includes a selectable indicator.

14. The computer-implemented method of claim 13, further comprising:
receiving, via the communications module and from the computing device, a signal indicating selection of the selectable indicator; and
responsive to receiving the signal indicating selection of the selectable indicator, sending, via the communications module and to the computing device, a signal causing the computing device to display, within the web browser, the amount of loyalty points stored in the loyalty points account.

15. The computer-implemented method of claim 9, further comprising:
monitoring the conversion rate of loyalty points to dollars;
determining a change in the conversion rate of loyalty points to dollars; and
responsive to determining the change in the conversion rate of loyalty points to dollars, determining that the difference between the purchase price of the one or more selected items and the amount of loyalty points drops below the threshold.

16. A non-transitory computer readable storage medium comprising computer-executable instructions which, when executed, configure a processor to:
determine an amount of loyalty points stored in a loyalty points account;
during an active web session within a web browser executing on a computing device:
determine that a first web page active within the web browser is not eligible for loyalty point redemption;
update an indicator displayed on a toolbar of the web browser to indicate that the first web page active within the web browser is not eligible for loyalty point redemption by at least one of causing the indicator to not be illuminated or highlighted, causing the indicator to be displayed in a first colour, or causing the indicator to not be animated;
determine that a second web page active within the web browser is eligible for loyalty point redemption;
obtain a conversion rate of loyalty points to dollars for the second web page active within the web browser and determine, based on the amount of loyalty points stored in the loyalty points account and the conversion rate for the second web page active within the web browser, an amount of dollars available to be redeemed on the second web page active within the web browser;
update the indicator displayed on the toolbar of the web browser executing on the computing device to indicate that the second web page active within the web browser is eligible for loyalty point redemption by at least one of causing the indicator to be illuminated or highlighted, causing the indicator to be displayed in a second colour that is different than the first colour, or causing the indicator to be animated, and to indicate the amount of dollars available to be redeemed on the second web page active within the web browser;
send, via a communications module and to the computing device, a signal causing one or more selectable options to be displayed on the second web page active within the web browser executing on the computing device, each selectable option displayed adjacent to a particular item and selectable to indicate selection of the particular item to be monitored; and
receive, via the communications module and from the computing device, a signal indicating selection of one or more items to be monitored;
monitor a purchase price of the one or more selected items and the amount of loyalty points stored in the loyalty points account;
determine that a difference between the purchase price of the one or more selected items and the amount of loyalty points drops below a threshold; and
responsive to determining that the difference between the purchase price of the one or more selected items and the amount of loyalty points drops below the threshold, send, via the communications module and to the computing device, a signal causing the computing device to display a notification that includes a selectable option to apply the loyalty points to offset the purchase price.

17. The non-transitory computer readable storage medium of claim 16, wherein the computer-executable instructions, when executed, further configure the processor to:
determine that the computing device has the active web session within the web browser; and
responsive to determining that the computing device has the active web session within the web browser, send the signal causing the computing device to display the notification within the web browser.

18. The non-transitory computer readable storage medium of claim 16, wherein the computer-executable instructions, when executed, further configure the processor to:
determine that the computing device does not have the active web session within the web browser; and
responsive to determining that the computing device does not have the active web session, send the signal causing the computing device to display the notification as one of an email message or a text message.

* * * * *